United States Patent [19]

Lateur

[11] 3,976,153
[45] Aug. 24, 1976

[54] VEHICLE WITH REMOVABLE TRACTION APPARATUS

[76] Inventor: Michel J. Lateur, 2621 Toledo Ave., Santa Clara, Calif. 95051

[22] Filed: Apr. 25, 1975

[21] Appl. No.: 571,467

[52] U.S. Cl. ............................ 180/9.2 C; 180/9.64; 305/23
[51] Int. Cl.² ......................................... B62D 55/04
[58] Field of Search ............. 180/9.2 C, 9.64, 9.2 R; 305/23, 32, 4, 20

[56] References Cited
UNITED STATES PATENTS

| | | | |
|---|---|---|---|
| 1,815,339 | 7/1931 | Turzicky | 180/9.64 |
| 2,852,317 | 9/1958 | Riemerschmid | 180/9.64 X |
| 3,724,580 | 4/1973 | Adams | 180/9.2 C |

Primary Examiner—Philip Goodman
Attorney, Agent, or Firm—Townsend and Townsend

[57] ABSTRACT

A vehicle having a traction apparatus which can be removably attached to the vehicle when the drive wheels thereof have been removed. The apparatus comprises a pair of endless, flexible tracks carried by a number of bogie wheels supported by elongated beam-like members with each track having means for making a driving connection between the adjacent drive axle of the vehicle. The apparatus is suitable for connection to the rear axle of a vehicle and the forward end of the apparatus is provided with means for locking the apparatus in place when the rear end of the apparatus is connected to the vehicle.

4 Claims, 8 Drawing Figures

VEHICLE WITH REMOVABLE TRACTION APPARATUS

This invention relates to improvements in the use of vehicles over snowy terrain and, more particularly, to a vehicle having an improved traction device removably coupled thereto.

BACKGROUND OF THE INVENTION

A number of attempts have been made to utilize traction devices with the drive wheels of a vehicle. For the most part, these prior attempts have resulted in very complicated constructions and ones which require considerable time and effort to connect the traction unit to a vehicle. Typical of these attempts are those disclosed in the following U.S. patents:

| | | |
|---|---|---|
| 1,411,523 | 1,631,114 | 2,584,512 |
| 3,107,924 | 3,600,044 | 3,639,011 |
| 3,682,266 | | |

Because the prior traction devices fail to provide a construction which is simple, yet rugged, and because the prior traction devices are difficult to install and remove from a vehicle, a need has arisen for a traction device which can be quickly and easily removed from the vehicle yet the traction device is simple and rugged in construction and adaptable for use with different types of vehicles. The present invention satisfies this need.

SUMMARY OF THE INVENTION

The present invention is directed to an improved vehicle-traction unit combination wherein the traction unit of the combination utilizes a pair of spaced, endless flexible tracks mounted by bogie wheels and mounting structure to the vehicle in a manner such that the drive axle of the vehicle can be quickly and easily coupled to the tracks for driving them either forwardly or in reverse. To this end, the apparatus includes front and rear mounting members which attach directly to the frame of the vehicle yet allow a driving connection to be made between the drive axle and drive wheels connected directly to the tracks for moving the same. The front mount of the apparatus provides a locking effect to prevent separation of the apparatus at its front end from the vehicle so long as the rear end of the apparatus is connected directly to the vehicle. Thus, a positive connection of the apparatus to the vehicle is assured at all times, yet the apparatus can be quickly removed from the vehicle merely by elevating the rear end of the vehicle, disconnecting the rear mount therefrom, then moving the apparatus from beneath the vehicle and out of its lock relationship at its front end to the vehicle.

While the apparatus will hereinafter be shown as being usable with a vehicle of the Volkswagen type, it is to be understood that the apparatus is suitable for use with different types of vehicles. Also, the following description will indicate that the apparatus is adapted for connection to the rear wheels of the vehicle; however, the apparatus could be coupled to other sets of wheels so long as the other sets are the drive wheels of the vehicle.

The primary object of this invention is to provide a vehicle with an improved traction apparatus removably coupled thereto wherein the apparatus has a pair of endless, flexible tracks located beneath the vehicle and drivingly connected to the drive axle thereof by suitable drive transfer means so that the vehicle can be movable over snowy or other types of terrain and the vehicle can operate normally without modification thereto except for the removal of the drive wheels thereof and the connection of the apparatus thereto.

Another object of this invention is to provide an improved traction apparatus for the drive axle of a vehicle wherein the apparatus includes a pair of endless, flexible tracks adapted to be supported by bogie wheels and other mounting structure beneath the vehicle and to be moved by a driving connection between the drive axle and the tracks themselves so that the vehicle can move over terrain which would be impossible if the vehicle were provided with standard drive wheels.

Other objects of this invention will become apparent as the following specification progresses, reference being had to the accompanying drawings for an illustration of the invention.

Figure 1:
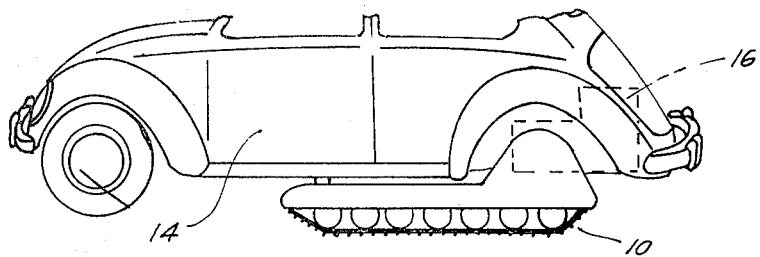
FIG. 1 is a side elevational view of a vehicle showing the apparatus of this invention mounted thereon.

The apparatus of the present invention is broadly denoted by the numeral 10 and is adapted to be removably attached to the rear axle 12 (FIG. 3) of a vehicle 14 of the type having an engine 16 mounted in the rear thereof as shown in dashed lines in FIG. 1. The apparatus is adapted to be readily coupled to the vehicle after the rear wheels have been removed from hubs 18, yet such hubs are used as the source of power and control for driving a pair of spaced, endless, flexible tracks 20 (FIG. 3) which form parts of apparatus 10. Tracks 20 are adapted to engage and move over snow covering the ground and thereby move the car either in forward or reverse depending upon the direction of rotation of hubs 18 under the influence of engine 16.

Apparatus 10 further includes a rear crossbar 22 and a pair of front crossbars 24, such crossbars adapted to be releasably secured to the vehicle so that the latter can be quickly converted for operation over a roadway to operation over snow. There is a front crossbar 24 for each track 20, respectively; however, crossbar 22 is common to both tracks 20.

At respective sides of each track 20, there is an inner support rail 26 and an outer support rail 28, the two rails extending substantially between crossbar 22 and the corresponding crossbar 24. The rear end of each inner rail 26 is secured by a bracket 30 to crossbar 22 in any suitable manner, such as by welding or the like. The rear end of each outer rail 28 is secured by a bracket 32 which extends upwardly from rail 28 and is secured by a pair of bolts 34 to the corresponding end of crossbar 22.

Figure 2:
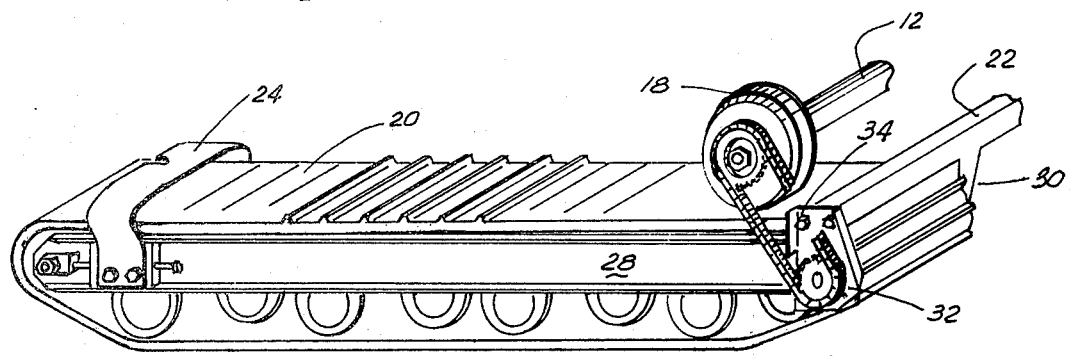
FIG. 2 is an enlarged, perspective view of the apparatus.
Figure 2A:
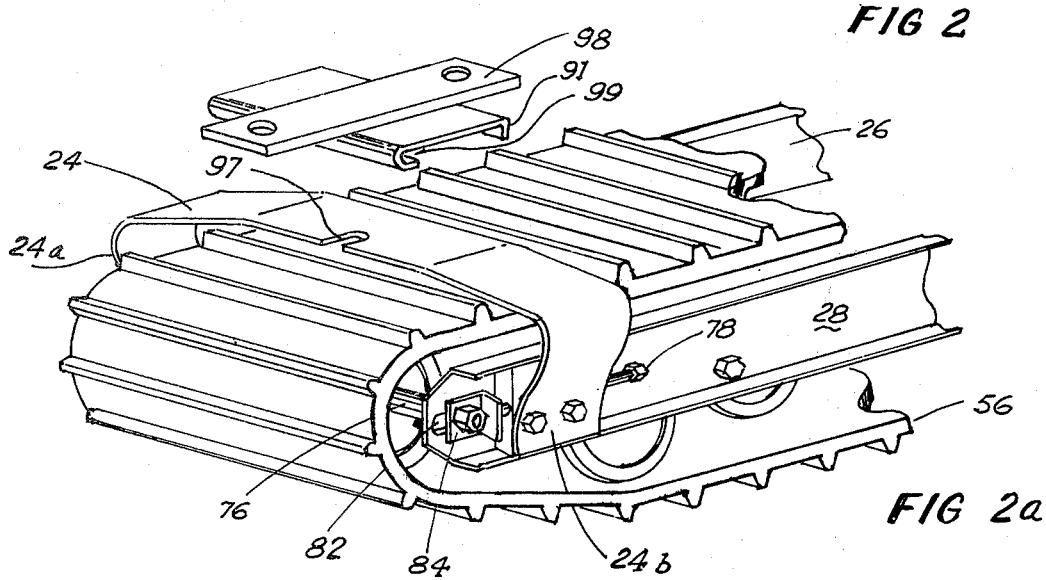
FIG. 2a is a fragmentary, perspective view of the apparatus showing the front portion thereof and the structure for connecting the same to the front part of a vehicle.

The front crossbar 24 of one of the tracks 20 is shown in FIGS. 2, 2a, 2b and 4 and has a length sufficient to permit it to extend slightly beyond the sides of the track. Crossbar 24 has a pair of downwardly extending end segments 24a and 24b for attachment with corresponding rails 26 and 28. As shown in FIG. 2a, each of these end segments is irregular in shape so that it can extend downwardly in a vertical direction for a certain distance and then inwardly for attachment to the corresponding rail, thereby avoiding interference with the upper stretch of the corresponding track 20. Crossbar 24 acts as a spring member between the apparatus 10 and the vehicle 14.

Figure 4:
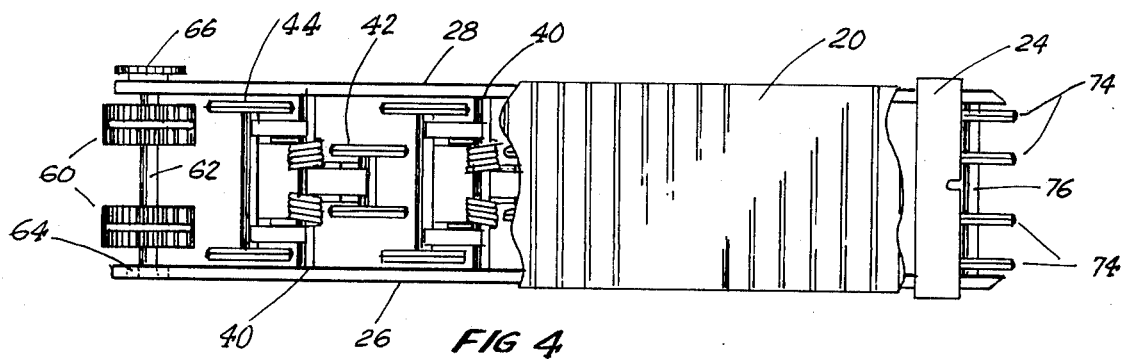
FIG. 4 is a top plan view of a portion of the apparatus showing one of the two tracks thereof and several sets of bogie wheels therefor.
Figure 5:
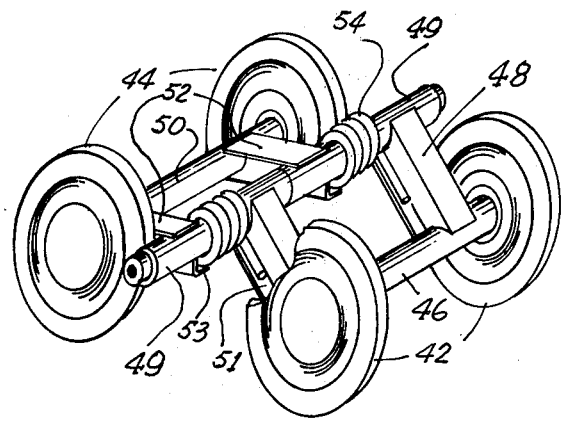
FIG. 5 is a perspective view of a set of bogie wheels.
Figure 6:
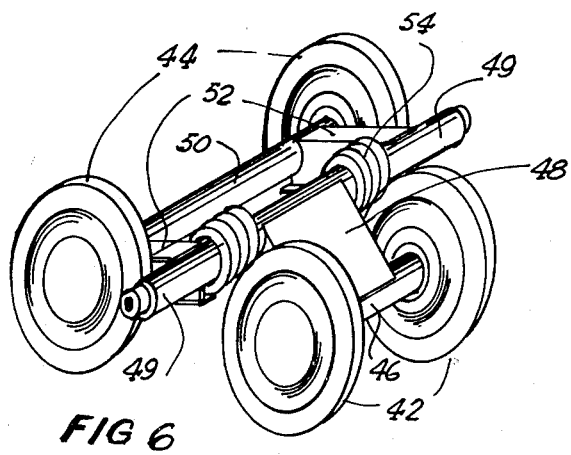
FIG. 6 is a view similar to FIG. 5 but showing a modification thereof.

As shown in FIG. 4, a number of shafts 40 are rigid to and extend between the lower margins of each pair of rails 26 and 28, respectively. For purposes of illustration, there are four such shafts 40 along the lengths of each pair of rails 26 and 28. Each shaft has a front pair of bogie wheels 42 (FIGS. 4, 5 and 6) and a rear pair of bogie wheels 44, bogie wheels 42 being mounted on a shaft 46 rotatably carried by a pair of arms 48 forming the connecting means between shafts 46 and 40 and to bearing sleeve 49 on shaft 40. Each arm 48 has a supporting lip 51 engaged by the corresponding end of a respective coil spring 54 surrounding shaft 40, the opposite end of the spring engaging a lip 53 on an arm 52 (FIG. 5) corresponding to bogie wheels 44. Similarly, bogie wheels 44 are rigid to the ends of a shaft 50 rotatably mounted on a pair of arms 52 which are pivotally mounted by bearing sleeves which are also rotatable on shaft 40 at locations spaced from arms 48. As shown in FIGS. 4, 5 and 6, bogie wheels 42 are staggered relative to bogie wheels 44 and the distance between each pair of bogie wheels 42 is substantially the same as that between the adjacent pair of bogie wheels 44. In the alternative, wheels 42 could be separated a greater distance than the distance between wheels 44 as shown in a second embodiment in FIG. 6.

A coil spring 54 is provided for each arm 48 and the adjacent arm 52, respectively, the coil spring being adapted to bias the corresponding arm 48 in a clockwise sense when viewing FIG. 2 but to bias the corresponding arm 52 in a counterclockwise sense when viewing FIG. 5. Thus, bogie wheels 42 and 44 corresponding to each shaft 40 will be biased downwardly and into engagement with the upper surface of the lower stretch 56 (FIG. 2a) of the corresponding track 20. Thus, bogie wheels 42 and 44 serve to maintain stretch 56 in an elongated, generally straight condition for engaging the ground therebeneath, yet the stretch can yield slightly at different locations along its length due to the yieldability of springs 54 of the various shafts 40.

Figure 3:
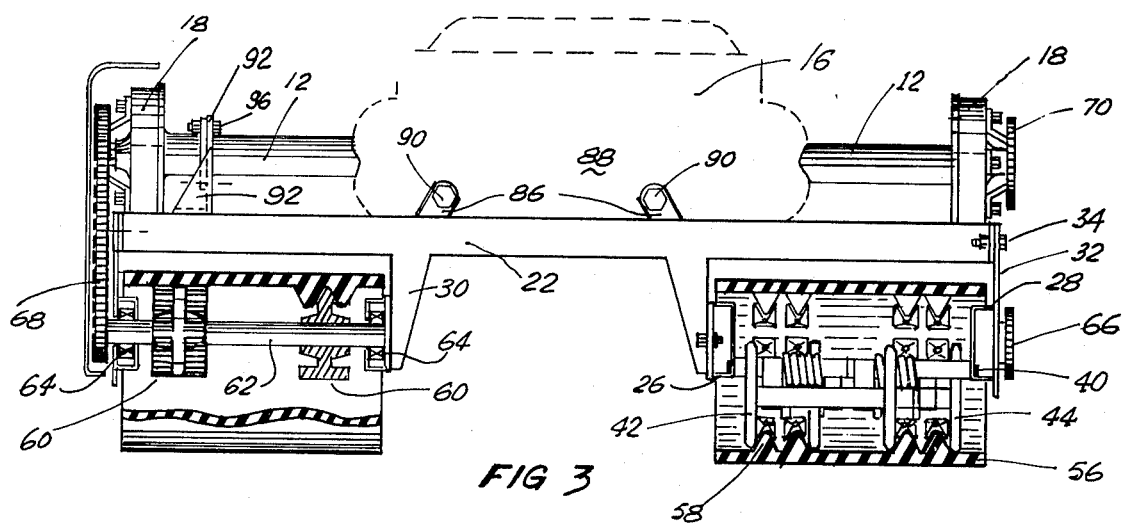
FIG. 3 is a vertical section through the apparatus and illustrating the way in which it is connected at its rear end to the vehicle.

As shown in FIG. 3, bogie wheels 42 and 44 engage the inner surface of each track 20 adjacent to respective pairs of spaced lugs 58 which are integral with the belt and are used for coupling the same to a pair of spaced drive wheels 60 (FIG. 3) rigid to a shaft 62 journalled by bearings 64 in rails 26 and 28 near the rear end thereof, there being a drive wheel 60 for each track 20, respectively. Drive wheels 60 drivingly or frictionally engage the inner surface of belt 20 between respective pairs of lugs 58 as shown in FIG. 3; thus, as wheels 60 are rotated by shaft 62, they impart movement to the corresponding belt 20.

The outer end of each shaft 62 has a sprocket 66 (FIG. 3) thereon. Sprocket 66 is coupled by an endless, flexible chain 68 (FIG. 3) to a second sprocket 70 which is to be removably coupled in any suitable manner to the corresponding hub 18. Thus, as the hub is rotated, sprockets 66 and 70 are rotated, causing wheels 60 to rotate and to move tracks 20. As shown in FIG. 4 the rearmost bogie wheels 44 provide the rear, lowermost guides for each track 20, and drive wheels 60 corresponding thereto provide the uppermost guides at the rear of tracks 20.

The forwardmost bogie wheels 42 (FIG. 4) of each track 20 provide guides about which the belt passes as it extends upwardly and forwardly from the ground, the belt then passing around a pair of front guide or idler wheels 74 (FIG. 4) rotatably mounted on a shaft 76 adjustably mounted on the front ends of corresponding rails 26 and 28. Each of rails 26 and 28 has a front slot 82 (FIG. 20) therein for receiving fasteners 84, whereby the corresponding shaft 76 can be adjustably secured to the corresponding rail using adjusting bolts 78, which are movably attached to rails 26 and 28, to move respective shafts 76 in a forward direction to tension the corresponding track 20.

Rear crossbar 22 is removably connected at four locations to vehicle 14. Specifically, crossbar 22 has a pair of centrally disposed brackets 86 (FIG. 3) which are adapted to be removably connected to the housing 88 of engine 16 by respective bolts 90. A pair of outer brackets 92 (only one of which is shown in FIG. 3) is rigidly carried by crossbar 22 near the outer end thereof. Each bracket 92 is adapted to be removably connected, and adjusted, to tension drive chain 68 by adjustable connection to a mounting plate 92 rigid to axle 12, the adjustable connection between bracket 92 and plate 94 being by releasable fasteners 96, such as bolts or the like, extending through slots in one or the other of bracket 92 and plate 94. In this way, crossbar 22 is connected at four points along its length, and axles 12 are positioned for proper chain tension.

Figure 2B:
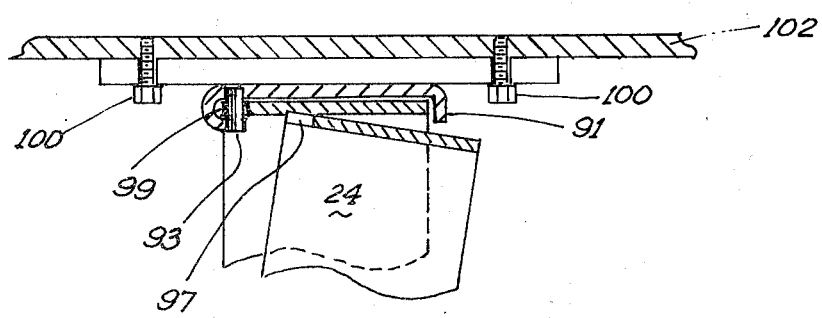
FIG. 2b is a cross-sectional view of the front cross member showing the way in which it is secured to the underside of the vehicle.

Crossbar 24 (FIGS. 2a and 2b) is mounted to a pair of brackets 98 by insertion into slot 99 thereof while at an angle, shown in dashed lines (FIG. 2b), allowing pin 93 to engage slot 97 (FIG. 2a) in crossbar 24 and transversely locate crossbar 24. When the rearward end of apparatus 10 is raised to locate the rear mounting points 86 and 92, the crossbar 24 is captured by the rearward lip 91 of bracket 98, which will not allow the crossbar to be released until it is again rotated. Therefore, no bolts are required to attach the forward end of apparatus 10 to brackets 98. In FIG. 2b, it is shown that each bracket 98 is mounted to the adjacent frame member 102 by means of bolts 100.

In use, and assuming that the rear wheels are on vehicle 14, such rear wheels are removed from hubs 18 after axle 12 has been elevated further above the ground to tilt the vehicle forwardly. Then, apparatus 10 is moved beneath the vehicle 14 until the front brackets 98 are above front crossbars 24. The vehicle is then lowered so that lips 91 and slot 99 capture crossbars 24 when rear brackets 86 are adjacent to their attachment points to engine housing 88 and brackets 92 are adjacent to plates 94 on axle 12. Brackets 86 and 92 are then secured to their respective attachment structures; thus, apparatus 10 is mechanically connected to the vehicle.

Sprockets 70 are then mounted on hubs 18 and chains 68 are caused to interconnect sprockets 66 and 70. The assembly of apparatus 10 on the vehicle is then complete and the vehicle can then be driven over snow-covered ground by operating the vehicle in the usual driving fashion. It may be desirable or necessary to replace the front wheels with runners or skis. This can be done either before or after apparatus 10 is installed. It may also be desirable to secure a safety cover over the drive chain and apparatus. When it is desired to remove apparatus 10 from the vehicle, the various connecting brackets 86 and 92 are removed while rear axle 12 is elevated above the ground in any suitable manner. Then, the rear wheels are again placed on the hubs, thereby rendering the vehicle operable for movement over a roadway.

I claim:

1. In combination: a vehicle having a drive shaft and means for rotating the drive shaft; a traction apparatus having a pair of spaced, endless, flexible tracks, a pair of spaced, elongated side members for each track, respectively, and a number of bogie wheel units for mounting each track, respectively, on the corresponding side members for movement relative thereto; a first crossbar and a second crossbar for each track, respectively, the crossbars being spaced apart and coupled with respective side members adjacent to corresponding ends thereof for releasably mounting the ends on the vehicle; means releasably coupling the second crossbar to the vehicle; means coupled with the first crossbar for releasably locking the same in a fixed position relative to the vehicle when the second crossbar is coupled thereto, said locking means including a bracket having a slot and a projection spaced from the slot, said first crossbar having a pair of opposed side margins, one of the side margins being receivable in the slot and the other side margin being adjacent to said projection when the first crossbar is locked in said position; and means coupled to the tracks for connecting the same in driving relationship to said drive shaft, whereby the tracks will be driven in response to the rotation of the drive shaft.

2. In combination: a vehicle having a drive shaft and means for rotating the drive shaft; a traction apparatus having a pair of spaced, endless, flexible tracks, a pair of spaced, elongated side members for each track, respectively, and a number of bogie wheel units for mounting each track, respectively, on the corresponding side members for movement relative thereto; means coupled with said side members of each track, respectively, for releasably mounting the ends of the side members on the vehicle, said mounting means including a front crossbar for each track, respectively, and a rear crossbar common to both tracks, each front crossbar being spaced above and extending transversely of the corresponding track, there being a pair of end segments coupling the ends of each front crossbar to the front ends of corresponding side members, said rear crossbar being spaced above and spanning said tracks transversely thereof, there being bracket means coupling the ends of the rear crossbar to the rear ends of adjacent side members, releasable fastening means for releasably connecting the rear crossbar to the vehicle, and lock means for releasably locking each front crossbar, respectively, to the vehicle; and means coupled to the tracks for connecting the same in driving relationship to said drive shaft, whereby the tracks will be driven in response to the rotation of the drive shaft.

3. Traction apparatus for a vehicle having a drive shaft and means for rotating the drive shaft comprising: a pair of spaced, endless, flexible tracks; a pair of spaced, elongated side members for each track, respectively; a number of bogie wheel units for mounting each track, respectively, on the corresponding side members for movement relative thereto; a first crossbar and a second crossbar for each track, respectively, the crossbars being spaced apart and coupled with respective side members adjacent to corresponding ends thereof and adapted to be releasably coupled to the vehicle for releasably mounting the ends on the vehicle; means for releasably coupling the second crossbar to the vehicle; means coupled with the first crossbar for releasably locking the same in a fixed position relative to the vehicle when the second crossbar is coupled thereto, said locking means including a bracket having a slot and a projection spaced from the slot, said first crossbar having a pair of opposed side margins, one of the side margins being receivable in the slot and the other side margin being adjacent to said projection when the first crossbar is locked in said position; and means coupled to the tracks for connecting the same in driving relationship to said drive shaft when the ends of the side members are mounted on the vehicle, whereby the tracks will be driven in response to the rotation of the drive shaft.

4. Traction apparatus for a vehicle having a drive shaft and means for rotating the drive shaft comprising: a pair of spaced, endless, flexible tracks; a pair of spaced, elongated side members for each track, respectively; a number of bogie wheel units for mounting each track, respectively, on the corresponding side members for movement relative thereto; means coupled with said side members of each track, respectively, and adapted to be releasably coupled to the vehicle for releasably mounting the ends of the side members on the vehicle, said mounting means including a front crossbar for each track, respectively, and a rear crossbar common to both tracks, each front crossbar being spaced above and extending transversely of the corresponding track, there being a pair of end segments coupling the ends of each front crossbar to the front ends of corresponding side members, said rear crossbar being spaced above and spanning said tracks transversely thereof, there being bracket means coupling the ends of the rear crossbar to the rear ends of adjacent side members, releasable fastening means for releasably connecting the rear crossbar to the vehicle, and lock means for releasably locking each front crossbar, respectively, to the vehicle; and means coupled to the tracks for connecting the same in driving relationship to said drive shaft when the ends of the side members are mounted on the vehicle, whereby the tracks will be driven in response to the rotation of the drive shaft.

* * * * *